Patented Feb. 10, 1942

2,272,562

UNITED STATES PATENT OFFICE 2,272,562

PROCESS FOR MANUFACTURING VEGETABLE PROTEINS

Hiromu Iwamae, Otake-cho, Saeki-gun, Japan

No Drawing. Application July 25, 1939, Serial No. 286,487. In Japan July 26, 1938

3 Claims. (Cl. 260—112)

The present invention relates to a process for preparing vegetable proteins by making use of sulfurous acid, and has for its object to obtain the bleached proteins, least subject to denaturation, with a most excellent quality as the materials for protein fibres or plastic products.

The present invention consists in the following steps. The proteins contained in the vegetable raw materials are dissolved in from 0.1N to N sulfurous acid.

Then the hydrogen ion concentration of the extraction liquid is adjusted nearly to the iso-electric point of the proteins to be precipitated, whereupon the desired product precipitates.

The ordinary methods for extracting the proteins from the proteinous raw materials make use of dilute alkali solutions. These methods are not satisfactory because vegetable proteins are altered by alkali with denaturation and decomposition. Hence the proteins obtained by extraction with alkali are weak and inferior materials for use in the manufacture of protein fibres, plastic products and so forth. This is because due to the action of alkali, the amino-groups within the protein molecules, which take the most important chemical role, are apt to be decomposed and separated in manufacturing various practical goods from proteins.

If, however, an acid solution is applied for extracting the proteins from the proteinous raw materials, the denaturization and decomposition reactions do not take place and the resulting product is of higher quality.

Heretofore, acid solutions, or account of low dissolving power, have been regarded inadequate for the extraction of the proteins from natural materials.

According to the present invention, however, proteins of superior quality are obtained from vegetable raw materials, by extraction with a solution of sulfurous acid of suitable concentration. Moreover, the solution of sulfurous acid thus applied as the extracting agent has the following effects.

The proteins, while being extracted, are bleached by the reducing and bleaching action of sulfurous acid, and are protected from oxidation. For this reason, they are obtained in better condition than those which are obtained by the hitherto-known methods. Consequently, the toughness, durability, and the tone of the colour of the article manufactured from these proteins are superior to those which are made from proteins obtained by other methods. In order to precipitate the proteins in the sulfurous acid extract, the acidity is adjusted with caustic alkali or any of alkali salts nearly to the iso-electric point of the proteins existing in the solvent, whereby the desired protein product is precipitated in maximum yield.

One example for carrying the present invention into practice is explained below.

1 kg. of soy-bean cake is steeped in 20 l. of from 0.1N to N sulfurous acid and kept stirring for 2 to 3 hours, thus thoroughly dissolving the proteins of the cake. The extraction liquid is then filtered or placed quietly for some time, whereby settles to the bottom of the liquid the insoluble residue, which is subsequently removed. To the pure and transparent liquid thus obtained, caustic alkali or any alkaline salt, such as a solution of caustic soda, or that of sodium carbonate, or sodium sulfite, is added to the iso-electric point of the proteins in the solvent (pH 4.0–5.0), whereby the proteins are precipitated in maximum yield.

The yield of the dried proteins is 20% of the original bean-cake.

I claim:

1. A process for the preparation of a protein material which consists of treating soybean meal with from .1 to 1. normal aqueous sulfurous acid, separating the resulting protein solution from the insoluble residue, precipitating the protein material in the solution by adding a neutralizing agent in quantity sufficient to bring the liquid to the isoelectric point of the protein, and separating the precipitated protein.

2. A process for the preparation of a protein material which consists of treating soybean meal with from .1 to 1. normal aqueous sulfurous acid, separating the resulting protein solution from the insoluble residue, precipitating the protein material in the solution by adding caustic alkali in quantity sufficient to bring the liquid to the isoelectric point of the protein, and separating the precipitated protein.

3. A process for the preparation of a protein material which consists of treating soybean meal with from .1 to 1. normal aqueous sulfurous acid, separating the resulting protein solution from the insoluble residue, precipitating the protein material in the solution by adding sodium carbonate in quantity sufficient to bring the liquid to the isoelectric point of the protein, and separating the precipitated protein.

HIROMU IWAMAE.